United States Patent [19]

Leaf

[11] Patent Number: 4,580,809
[45] Date of Patent: Apr. 8, 1986

[54] VEHICLE SUSPENSION SYSTEM
[75] Inventor: Ronn J. Leaf, Lexington, Ky.
[73] Assignee: Vehicle Systems, Inc., Lexington, Ky.
[21] Appl. No.: 608,366
[22] Filed: May 9, 1984
[51] Int. Cl.$^4$ .............................................. B60G 11/46
[52] U.S. Cl. ..................................................... 280/712
[58] Field of Search .............. 280/712, 718, 686, 689, 280/713; 267/31, 32, 18

[56]  References Cited
U.S. PATENT DOCUMENTS

| 3,233,915 | 2/1966 | Hamlet | 280/712 |
| 3,494,609 | 2/1970 | Harbers, Jr. | 280/718 |
| 3,578,355 | 5/1971 | Oeder | 280/712 |
| 3,802,718 | 4/1974 | Schaeff | 280/712 |

4,313,620  2/1982  Posnikoff ........................... 280/718

Primary Examiner—Richard A. Bertsch
Attorney, Agent, or Firm—Hill, Van Santen, Steadman & Simpson

[57] ABSTRACT

A vehicle suspension system is provided which reduces longitudinal roll tendency in vehicles having a frame, an axle and a suspension system. An auxiliary spring is provided to act against upward bias of the suspension system on the side of the vehicle where the frame is diverging from the axle and is ineffective on the converging side. The normal suspension components resist the roll on the converging side. Collars are also provided to prevent displacement of the torque arm of the suspension system.

10 Claims, 9 Drawing Figures

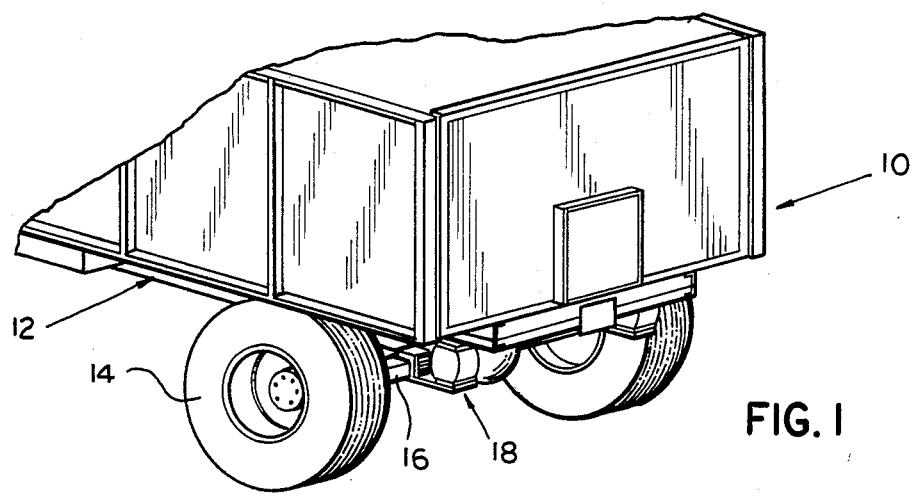
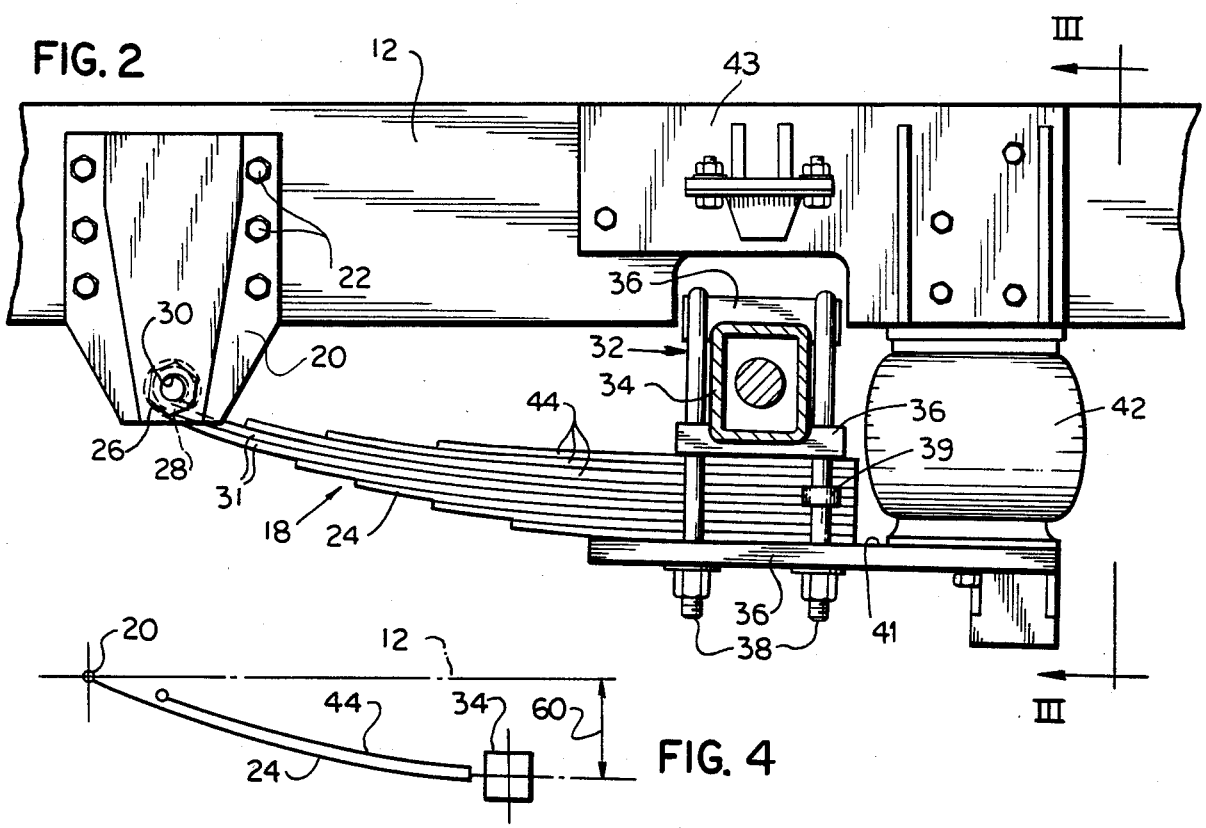

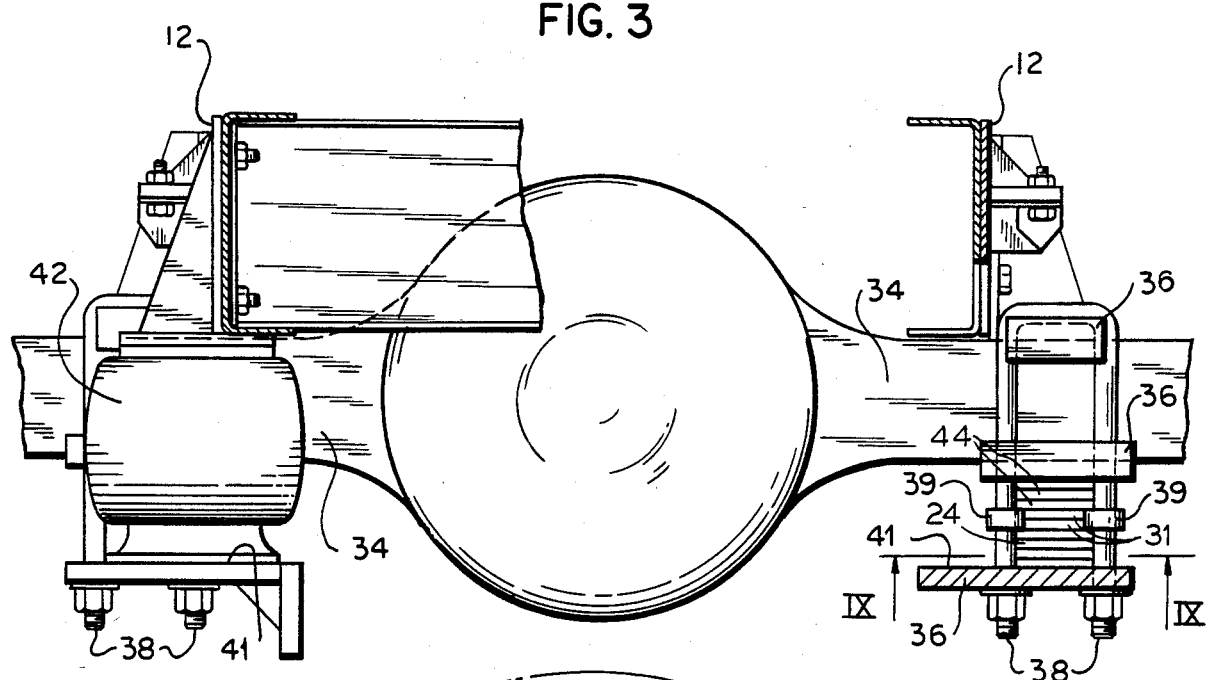
FIG. 3
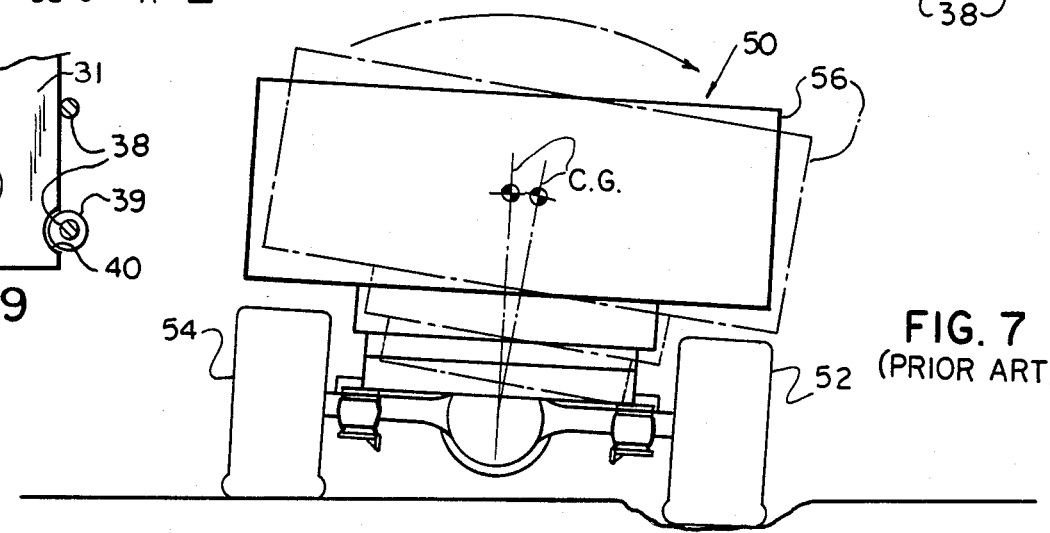
FIG. 9
FIG. 7 (PRIOR ART)
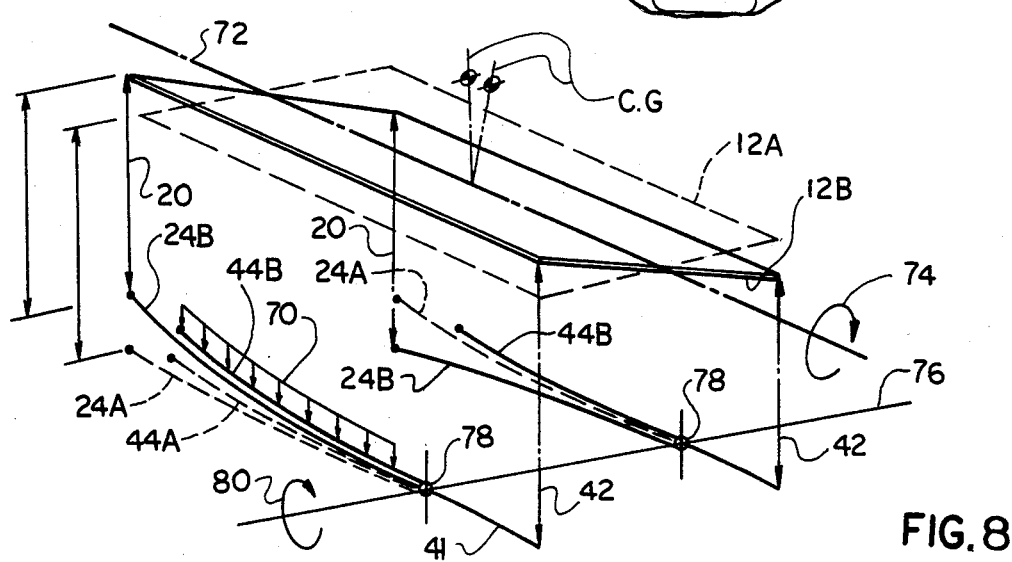
FIG. 8

VEHICLE SUSPENSION SYSTEM

BACKGROUND OF THE INVENTION

1. Field of the Invention

The present invention relates to vehicle suspension systems and more particularly to a vehicle suspension system for reducing roll tendency in a moving vehicle.

2. Description of the Prior Art

Rotational stability in vehicle dynamics involves constraint of the vehicle frame about the longitudinal axis of the vehicle relative to the plane containing the axle system. The plane containing the frame has a tendency to rotate about the roll center of the vehicle while the axle plane is generally treated as a fixed horizontal plane in discussions involving vehicle roll characteristics.

The externally applied force that produces roll is generated by curvilinear motion of the vehicle in the longitudinal direction. It is treated as a horizontal force acting at the vehicle's center of gravity and parallel to the axle plane. Under the influence of this force, the axle-plane and frame-plane converge and diverge imparting a rolling motion to the vehicle which generally creates adverse ride conditions on passengers and cargo.

Resistance to roll is commonly controlled by component forces of the suspension system which react unidirectionally and singly on the converging side of the vehicle. In conventional air suspension systems, as the vehicle rolls, the springs and torque arms on the converging side react to achieve equilibrium while the springs on the diverging side react in the roll direction, contributing to roll displacement.

In vehicle systems requiring high ride quality, suspension springs of low rate-high deflection are employed. However, this arrangement produces adverse roll stability involving high degrees of rotational displacement.

SUMMARY OF THE INVENTION

The present invention provides a high ride quality suspension system with high roll stability. This system utilizes a common vehicle air suspension used on cargo and passenger carrying vehicles. The components consist of a hanger, torque arm, air spring, shock absorber and pneumatic controls in an arrangement at each axle and on each side of the vehicle. The hanger is attached to the frame with a connection hole to receive the torque arm. A clamping bolt or fastener is used to secure the forward end of the torque arm to the hanger. Within the front arm of the torque arm is a joint which provides constrained movement of the arm relative to the hanger. The torque arm extends rearward to the axle connection. The arm is multi-leaf or mono-leaf with rectangular cross-sectional construction. The arm is rigidly attached to the axle by an arrangement of plates and fasteners. An air spring seat is provided as a integral attachment with the arm at the axle connection and extends to the rear of the axle.

The unique feature of this inventive system involves an auxiliary spring member which is rigidly attached to the axle clamp group. It extends forward of the axle in a cantilevered fashion in mono-leaf or multi-leaf configurations with rectangular cross-sectional construction. Prior to the roll condition the torque arm is deflected to support a portion of the vehicle load while the air springs support the remaining load. As roll is initiated, the auxiliary spring reacts against the torque arm to reduce the upward roll displacement on the diverging side of the vehicle.

The radius of curvature of the auxiliary spring in the unladen condition coincides with the laden configuration of the torque arm. When roll is initiated and the torque arm is displaced upward on the diverging side, a reaction is produced by the auxiliary spring. This reaction produces a reduction in the deflection of the torque arm thereby reducing the roll displacement of the suspension system on the diverging side.

Since the auxiliary spring is rigidly attached to the axle, torsional displacement is imparted along the axis of the axle. On the diverging side, this creates a displacement of the spring seat away from the frame which increases the air spring volume and lowers the force against the frame. The result of this condition further lowers the roll contributing force on the diverging side of the vehicle.

On the converging side, transmission of torsional displacement produces an extension of the air spring volume and has a tendency to lower the upward roll resisting force, but the torque arm is being simultaneously displaced upward. Due to the geometric location of the air spring relative to the axle and torque arm length, the resulting upward roll resisting force is preserved through the mechanics of forced equilibrium.

When the vehicle is operating in an unladen condition, the torque arm and auxiliary spring react with each other to form an assembly of combined intermediate radius of curvature. Since the system has a constant ride established by the air spring the intermediate spring curvature introduces a pinion angle in applications involving drive axles. This condition is similar to the pinion angle that exists in conventional steel springs suspension systems.

BRIEF DESCRIPTION OF THE DRAWINGS

FIG. 1 is a partial respective view of a vehicle showing placement of a suspension system embodying the principles of the present invention.

FIG. 2 is a side elevational view of the suspension system shown in FIG. 1 with the wheel removed for clarity.

FIG. 3 is a partial sectional view taken along the roll axis generally along the lines III—III of FIG. 2.

FIG. 4 is a schematic diagram of the suspension system at rest.

FIG. 5 is a schematic diagram of the suspension system on the converging side during a roll movement.

FIG. 6 is a schematic view of the suspension system on the diverging side during a roll.

FIG. 7 is a rear view of a vehicle employing a prior art suspension system and showing an amplified roll condition.

FIG. 8 is a perspective schematic view of a suspension system embodying the principles of the present invention during a roll.

FIG. 9 is a partial sectional view taken generally along the lines IX—IX of FIG. 3.

DESCRIPTION OF THE PREFERRED EMBODIMENTS

In FIG. 1 there is shown a vehicle 10 comprising a vehicle frame 12, wheels 14 and a transverse axle 16. A suspension system 18 embodying the principles of the present invention is shown in FIG. 1.

FIG. 2 shows the suspension system 18 in greater detail where it is seen that there is a hanger 20 secured to the vehicle frame 12 by appropriate fastening means 22 such as bolts or rivets. A torque arm 24 which may be multi-leaf or mono-leaf with rectangular cross-sectional construction is pivotally secured at a first end to the hanger 20 by means of a clamping bolt 26 extending through an eye 28 of the torque arm 24 and through an opening 30 in the hanger 20. Two main springs 31 of the torque arm 24 wrap around to form the eye 28. The torque arm extends rearwardly to an axle connection at a second end shown generally at 32. The torque arm 24 is rigidly attached to an axle housing 34 by an arrangement of plates 36 and fasteners 38 such as bolts. A pair of collars 39 are provided on the two rear bolts 38 and are received in recessed areas 40 (FIG. 9) in the two main leaves 31 of the torque arm 24. This is a safety feature for the system. The collars 39 engage the main leaves 31 and are intended to temporarily contain these leaves from being pulled out of the clamp group during conditions where the bolts might inadvertently become loose through neglect or improper maintenance. An air spring seat 41 is provided as an integral attachment with the torque arm 24, being a portion of bottom plate 36 extending rearwardly of the axle. An air spring 42 is positioned between the air spring seat 41 and the upper frame assembly 43.

An auxiliary spring member 44, shown as the top three leaves secured at a first end above the torque arm 24, extends forwardly of the axle housing 34 in a cantilevered fashion. This auxiliary spring may be of multi-leaf or mono-leaf configuration with rectangular cross-sectional construction.

FIG. 7 is a rear view of a vehicle including a suspension system as disclosed in the prior art. The vehicle 50 is shown having a right wheel 52 displaced lower than the left wheel 54 which could occur if the right wheel 52 hit a hole or a low spot in the pavement or rolled off onto a low shoulder. The movement of the right wheel 52 into a depression causes the truck body 56 to roll toward that side as indicated by the phanthom line. The center of gravity C.G. also shifts to the right as the truck body 56 moves. A similar action occurs when the vehicle is traveling along a flat surface when the vehicle moves in a curvilinear motion in the longitudinal direction, such as by entering a turn. During such motion, there is an externally applied force that produces roll which is treated as a horizontal force acting at the vehicle's center of gravity C.G. and parallel to the axle plane. Thus, if the vehicle is turning to the left, the vehicle body will pivot to the right as is shown in FIG. 7.

In conventional air suspension systems, as shown in FIG. 7, as the vehicle rolls, the springs and torque arms on the converging side (right side) react against the roll direction to achieve equilibrium while the springs on the diverging side (left side) react in the roll direction, contributing to roll displacement.

In vehicle systems requiring high ride quality, suspension springs of low rate, high deflection are employed. This amplifies the adverse roll stability and results in high degrees of rotational displacement.

The present invention provides for the use of the auxiliary spring 44 positioned in abutment with the torque arm 24. As seen in the schematic diagram of FIG. 4, when the vehicle is in a laden condition and traveling in a straight line on an even road, the auxiliary spring 44 lays against the top of the torque arm 24 at a combined intermediate radius of curvature. Normally, the auxiliary spring 44 and the torque arm 24 have different radii of curvature, but when they are secured together at one end, such as being clamped to the axle, the two press against each other and assume an intermediate radius of curvature. A height 60 between the center of the axle 34 and the vehicle frame 12 is determined by the design height of the air spring.

When the vehicle enters a roll condition, one side of the vehicle frame converges with the axle and on the other side the vehicle frame diverges from the axle. The converging side is shown schematically in FIG. 5 and the diverging side is shown schematically in FIG. 6. As seen in FIG. 5, as the frame 12 moves downwardly as indicated by arrow 62, the torque arm 24 reacts against the downward movement of the frame and absorbs some of the movement while flexing away from the radius of curvature. The air spring also absorbs some of the displacement of the frame 12 toward the axle 34 as indicated by a smaller line 64. The auxiliary spring 44 is moved away from the torque arm 24 and exerts no force on the torque arm or any other component of the suspension system. As seen in FIG. 3, the torque arm and spring are placed outboard of the vehicle frame 12 and thus the torque arm 24 is free to move up above the bottom of the frame.

On the diverging side, as seen in FIG. 6, the frame member 12 moves away from the axle 34 as seen by arrow 66. The air spring 42 is somewhat elongated as seen by line 68. Since the torque arm 24 is secured to the frame 12 through the hanger 20, the torque arm is pulled upwardly against the auxiliary spring 44. The auxiliary spring 44 then exerts a downward force along its entire length as seen by arrows 70 which acts against the divergence of the frame 12 relative to the axle 34.

FIG. 8 is a perspective schematic view of the elements and forces present during operation of a vehicle embodying the principles of the present invention and including the vehicle experiencing a roll condition. The vehicle frame is indicated in a stable position at 12A shown in phantom. The vehicle frame is shown in a roll condition at 12B in solid lines. A longitudinal axis of the vehicle is represented by line 72 and rolling of the vehicle frame is indicated by arrow 74.

The vehicle axle is represented by line 76 and the connection of the torque arms to the axle is shown at 78. The torque arms are shown in their non-roll position at 24A in phantom and the auxiliary spring is also shown at its non-roll position at 44A. The roll position of the torque arm is shown at 24B and the roll position of the auxiliary spring is shown at 44B. The hangers which connect the torque arm with the frame are shown at 20 and the air springs are represented by arrows 42. The center of gravity C.G. is shown above the longitudinal axis 72 of the vehicle. When the vehicle is in a non-roll condition, the auxiliary springs 44A lay against the torque arms 24A providing for a conventional ride of the suspension. When the vehicle enters a roll condition, one side of the vehicle frame 12B converges on the axle axis 76 causing the torque arm 24B to be deflected downwardly against the bias of the torque arm. The reaction of the torque arm tends to act against the force of the roll to achieve an equilibrium. On the diverging side, the torque arm 24B is displaced upwardly in the direction of its normal bias and a reaction force is produced by the auxiliary spring 44B as shown by arrows 70. This reaction force produces a reduction in upward deflection of the torque arm 24B thereby reducing the roll displacement of the suspension system on the diverging side.

Since the auxiliary spring 44B is rigidly attached to the axle 76, torsional displacement, as represented by arrow 80, is imparted along the axis of the axle. On the diverging side, this creates a displacement of the spring seat 41 away from the frame which increases the air spring volume and lowers the force against the frame 12B. The result of this condition further lowers the roll contributing force on the diverging side of the vehicle.

On the converging side, transmission of torsional displacement 80 produces an extension of the air spring volume and has the tendancy to lower the upward roll resisting force of the air spring, but the torque arm is being simultaneously displaced downward. Due to the geometric location of the air spring relative to the axle and arm and torque arm length, the resulting upward roll resisting force is preserved through the mechanics of forced equilibrium.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. In a vehicle having a frame extending along a longitudinal axis and a suspension system including a torque arm pivotally attached at one end to said frame and at an opposite end clamped to an axle and an air spring seat clamped to an opposite side of said axle from said torque arm, the improvement comprising:
   an auxiliary spring attached in a cantilevered fashion to engage and act against upward movement of said torque arm relative to said axle and to have no effect on said torque arm during downward movement of said torque arm relative to said axle, whereby roll forces of said vehicle about said longitudinal axis which cause divergence of one side of said vehicle frame relative to said axle are resisted by said auxiliary spring.

2. The device of claim 1 wherein said auxiliary spring is rigidly clamped at one end to said axle and engagingly overlies at least a portion of said torque arm.

3. The device of claim 2 wherein said torque arm has at least one leaf of a rectangular cross-sectional construction and said auxiliary spring has at least one leaf of a rectangular cross-sectional construction.

4. In a vehicle having a frame extending along a longitudinal axis, an axle extending along a transverse axis below said frame, and a suspension system connecting said axle with said frame, said suspension system comprising:
   a torque arm means securely clamped at a second end to said axle and pivotally connected to said frame at a first end,
   said first end being capable of moving upward and downward relative to said axle upon movement between said axle and said frame,
   an air spring means secured to said frame at one end and secured to a seat at an opposite end,
   said seat being rigidly secured to said axle,
   the improvement of an auxiliary spring means secured to said axle at a first end in a cantilevered manner and engagable against said torque arm means to act against said relative upward movement of said torque arm second end and to be ineffective against relative downward movement of said torque arm second end.

5. The device of claim 4 wherein said torque arm means has at least one leaf of a rectangular cross-sectional construction and said auxiliary spring means has at least one leaf of a rectangular cross-sectional construction which is secured at one end to said axle in a cantilevered manner to overlie said torque arm means.

6. The device of claim 5 wherein said torque arm means is clamped to said axle by means of bolts, at least one of said leaves of said torque arm means having recessed areas adjacent said bolts, and including collar means removably carried on said bolts to engage with said recesses whereby said leaves are locked in position relative to said bolts.

7. A device for resisting longitudinal roll in a vehicle having a frame, an axle and suspension system connecting said frame with said axle, said suspension system including spring means attached to said axle and biased upwardly against said frame to urge said axle and said frame apart comprising:
   second spring means immediately acting against convergence of said vehicle frame and said axle on one side of said vehicle, and simultaneously immediately resisting said upward bias on the opposite side of said vehicle.

8. The device of claim 7 wherein said spring means comprises a torque arm means securely clamped at a second end to said axle and pivotally connected at a first end to said frame and being biased upwardly against said frame, and an air spring means positioned between said frame and said axle, on an opposite side of said axle from said torque arm means and also being biased upwardly against said frame, and said second spring means comprises an auxiliary spring means securely attached to said axle in a cantilevered manner to engagingly overlie a portion of said torque arm means to resist upward movement of said second end of said torque arm means relative to said axle.

9. The device of claim 8 wherein said torque arm means has at least one leaf of a rectangular cross-sectional construction and said auxiliary spring means has at least one leaf of a rectangular cross-sectional construction.

10. In a vehicle operable in a laden or unladen condition and having a frame extending along a longitudinal axis, an axle extending along a transverse axis below said frame, and a suspension system connecting said axle with said frame, said suspension system comprising:
   a torque arm comprising at least one leaf spring having a radius of curvature and being pivotally connected to said frame at a first end and securely clamped to said axle at a second end,
   said first end being capable of moving upward and downward relative to said axle upon movement between said axle and said frame,
   an air spring secured to said frame at one end and secured to a seat at an opposite end,
   said seat being rigidly secured to said axle,
   an auxiliary spring comprising at least one leaf spring having a radius of curvature and being secured to said axle at a first end in a cantilevered manner and engagable against said torque arm along the entire length of said auxiliary spring,
   said radius of curvature of said auxiliary spring in an unladen condition coinciding with said radius of curvature of said torque arm in a laden condition, said torque arm and auxiliary spring reacting against each other in an unladen condition to form an intermediate radius of curvature, whereby, said auxiliary spring reacts immediately against roll forces about said longitudinal axis by resisting upward movement of said first end of said torque arm relative to said axle on one side of said vehicle and simultaneously on the opposite side of said vehicle, the torque arm moves away from engagement with said auxiliary spring to avoid assistance of said roll forces.

* * * * *